(12) United States Patent
Banowetz et al.

(10) Patent No.: US 8,839,684 B2
(45) Date of Patent: Sep. 23, 2014

(54) MEASUREMENT DEVICE AND METHOD FOR GENERATOR

(75) Inventors: Daniel Lawrence Banowetz, Glenville, NY (US); Richard Hatley, Morristown, NJ (US); Peter John McGrath, Fair Lawn, NJ (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 13/553,003

(22) Filed: Jul. 19, 2012

(65) Prior Publication Data

US 2014/0020483 A1    Jan. 23, 2014

(51) Int. Cl.
  *G01L 1/04* (2006.01)
(52) U.S. Cl.
  USPC ........................................ 73/862.621; 73/862
(58) Field of Classification Search
  USPC ............................................ 73/862.621, 862
  See application file for complete search history.

(56) References Cited

U.S. PATENT DOCUMENTS

| | | | | |
|---|---|---|---|---|
| 4,901,572 A | * | 2/1990 | Suyama | 73/572 |
| 4,962,660 A | * | 10/1990 | Dailey et al. | 73/12.09 |
| 5,012,684 A | * | 5/1991 | Humphries | 73/865.8 |
| 5,020,234 A | * | 6/1991 | Alkire et al. | 33/656 |
| 5,295,388 A | * | 3/1994 | Fischer et al. | 73/12.09 |
| 5,524,474 A | * | 6/1996 | Lavallee et al. | 73/12.09 |
| 7,112,909 B2 | * | 9/2006 | Swartout et al. | 310/214 |
| 2014/0020470 A1 | * | 1/2014 | Tsutsui et al. | 73/645 |

* cited by examiner

*Primary Examiner* — Lisa Caputo
*Assistant Examiner* — Jamel Williams
(74) *Attorney, Agent, or Firm* — Dority & Manning, P.A.

(57) ABSTRACT

A measurement device for a generator and a method for measuring stator wedge preload are disclosed. The generator includes a stator and a rotor, the stator including a stator wedge. The measurement device includes a force application device, the force application device including an actuator operable to apply a force to the stator wedge. The measurement device further includes a sensor operable to measure displacement of the stator wedge. The measurement device further includes a controller in communication with the force application device and the sensor and configured to collect data associated with the force and the displacement.

20 Claims, 8 Drawing Sheets

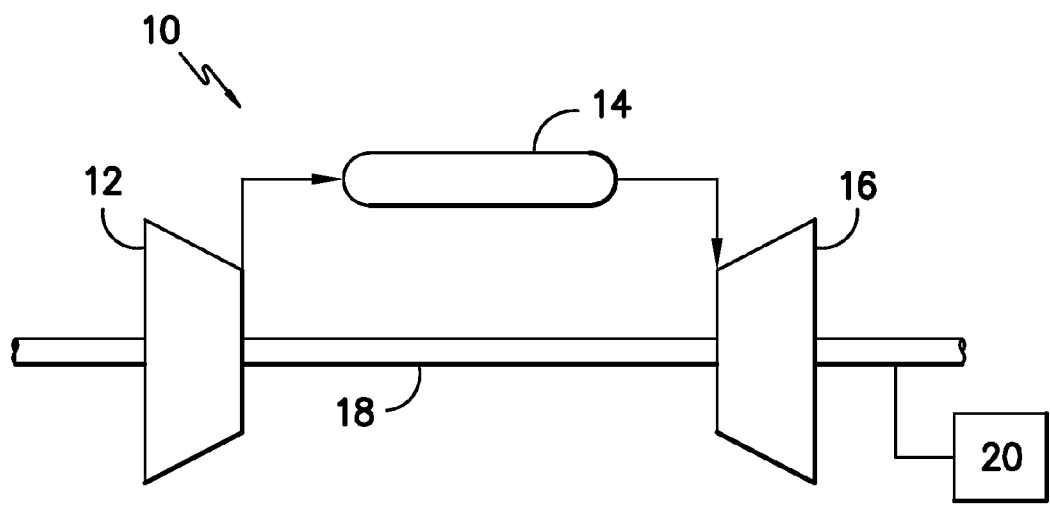
FIG. -1-

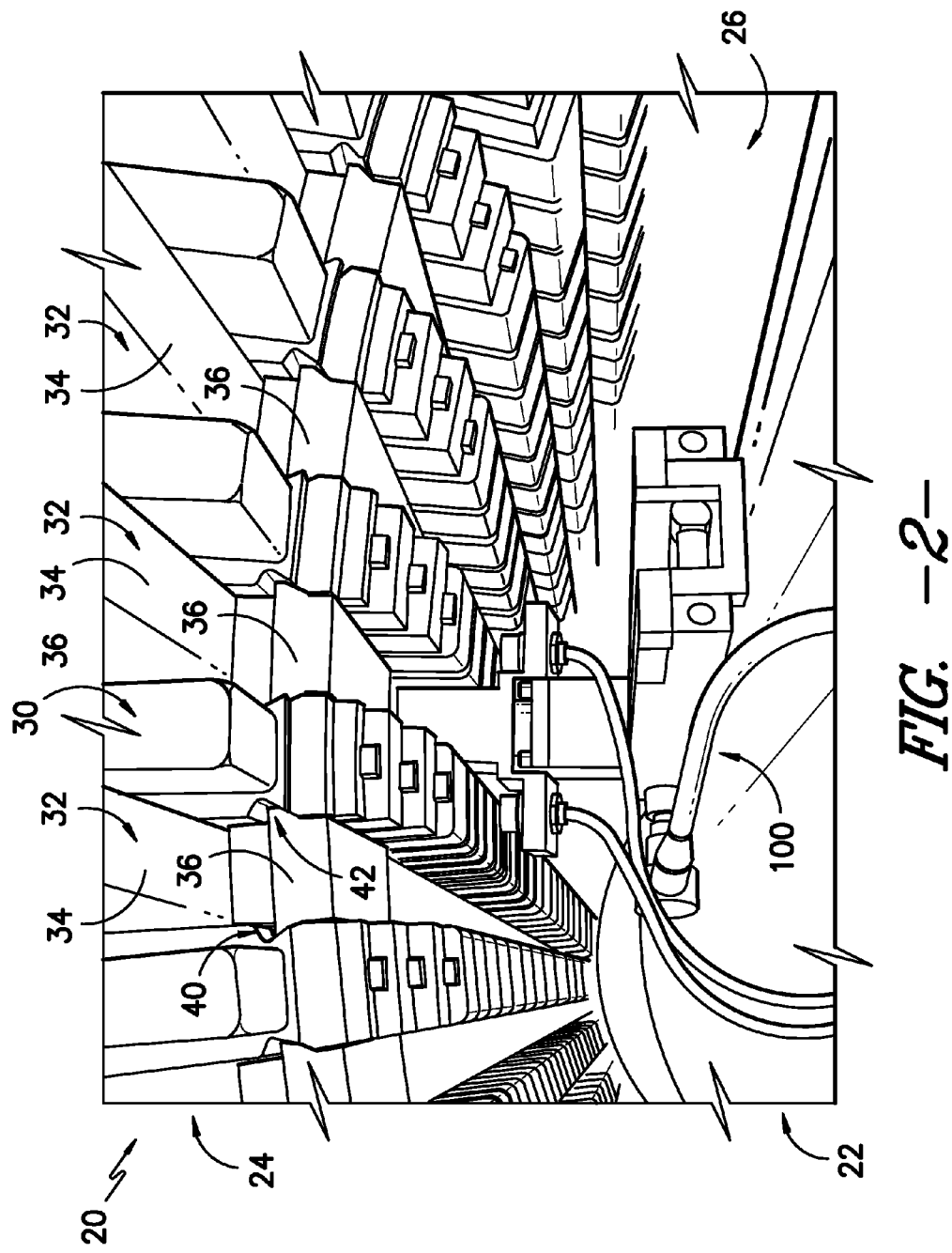
FIG. -2-

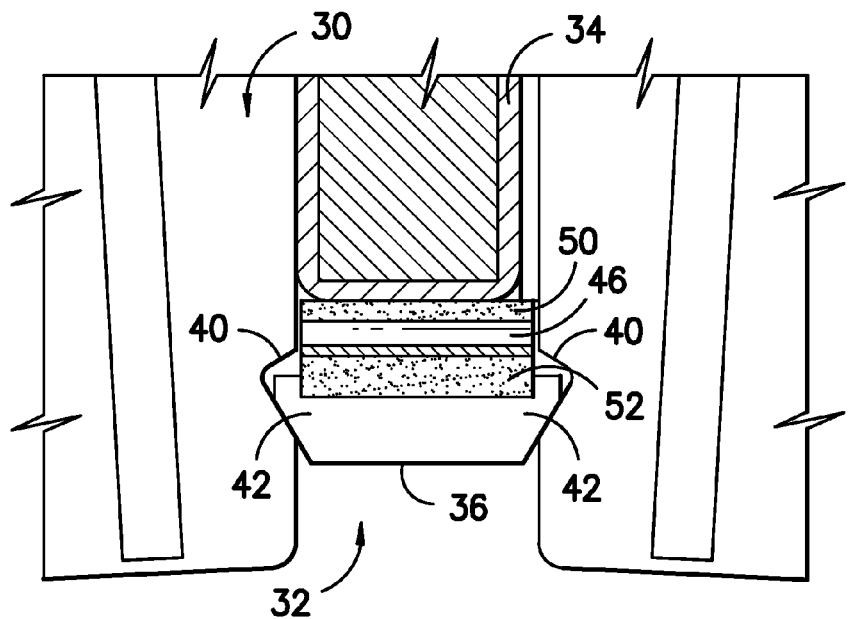
FIG. -3-
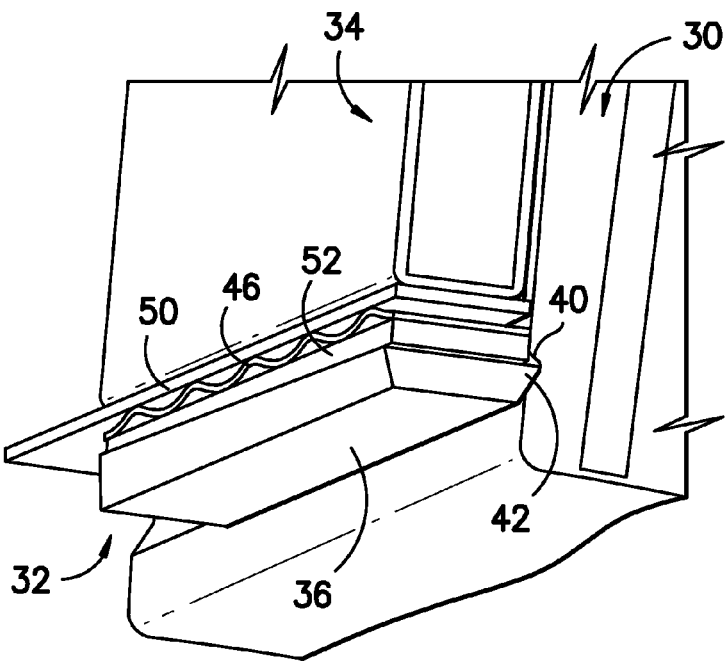
FIG. -4-

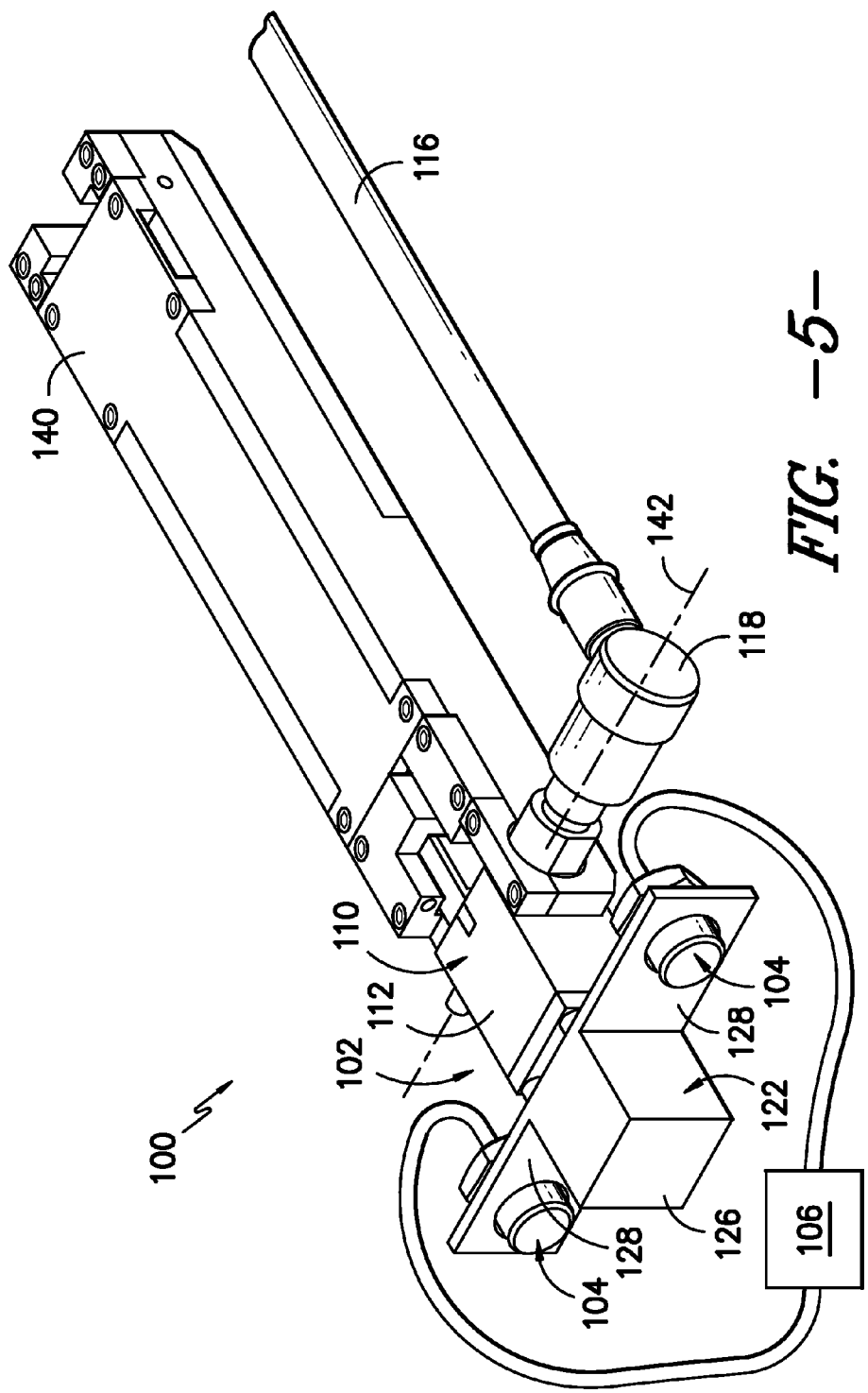
FIG. -5-

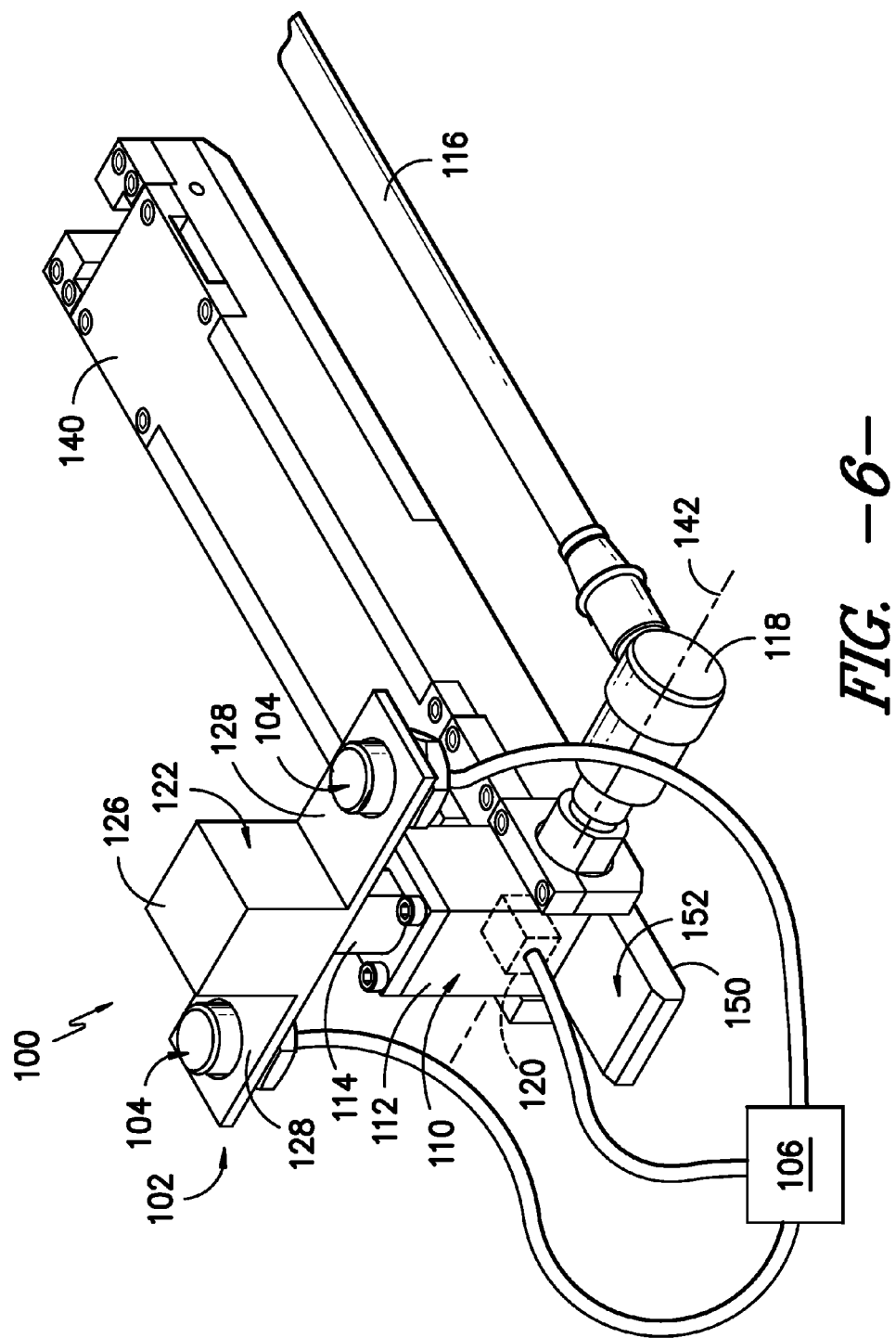
FIG. -6-

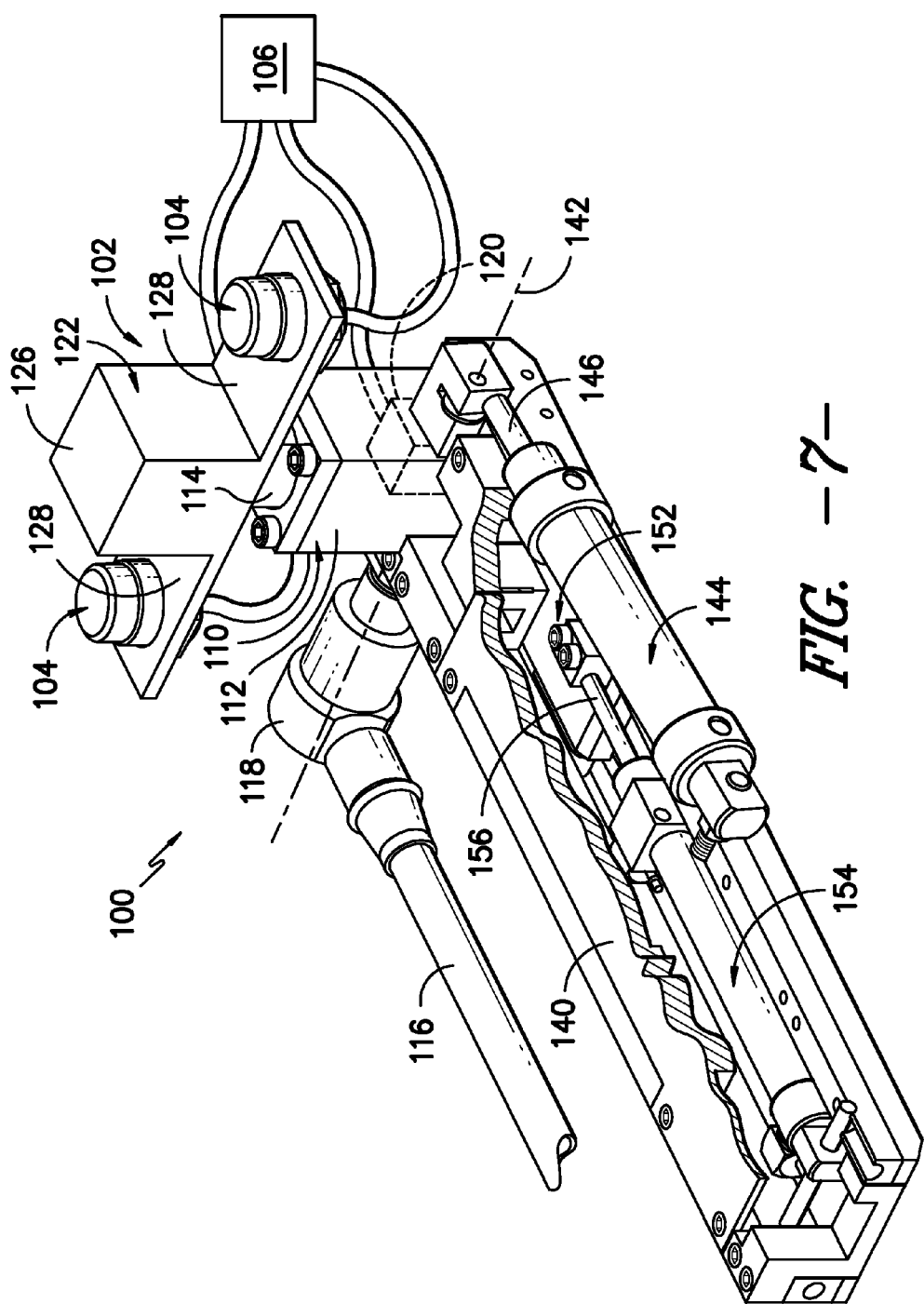
FIG. -7-

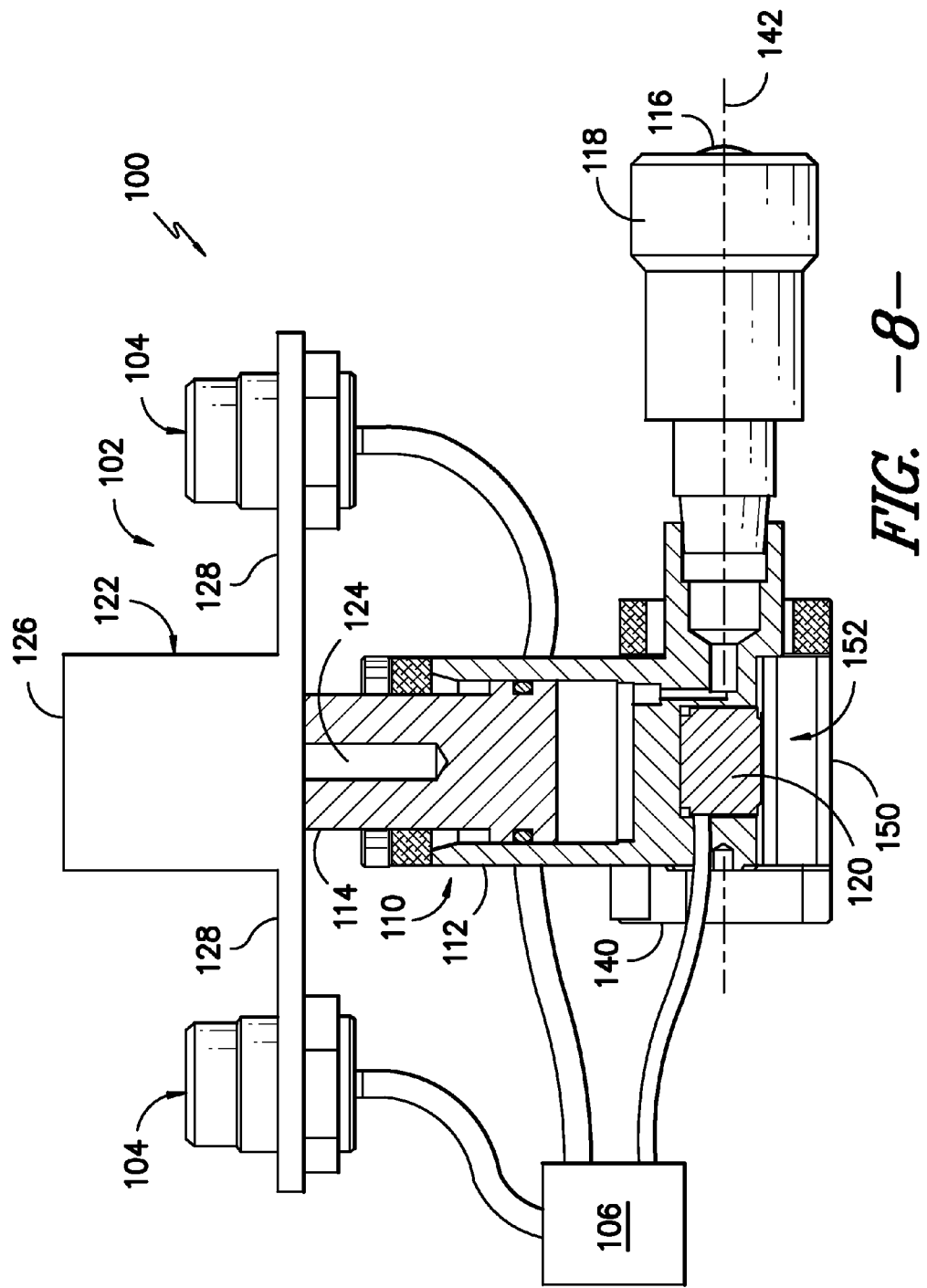
FIG. -8-

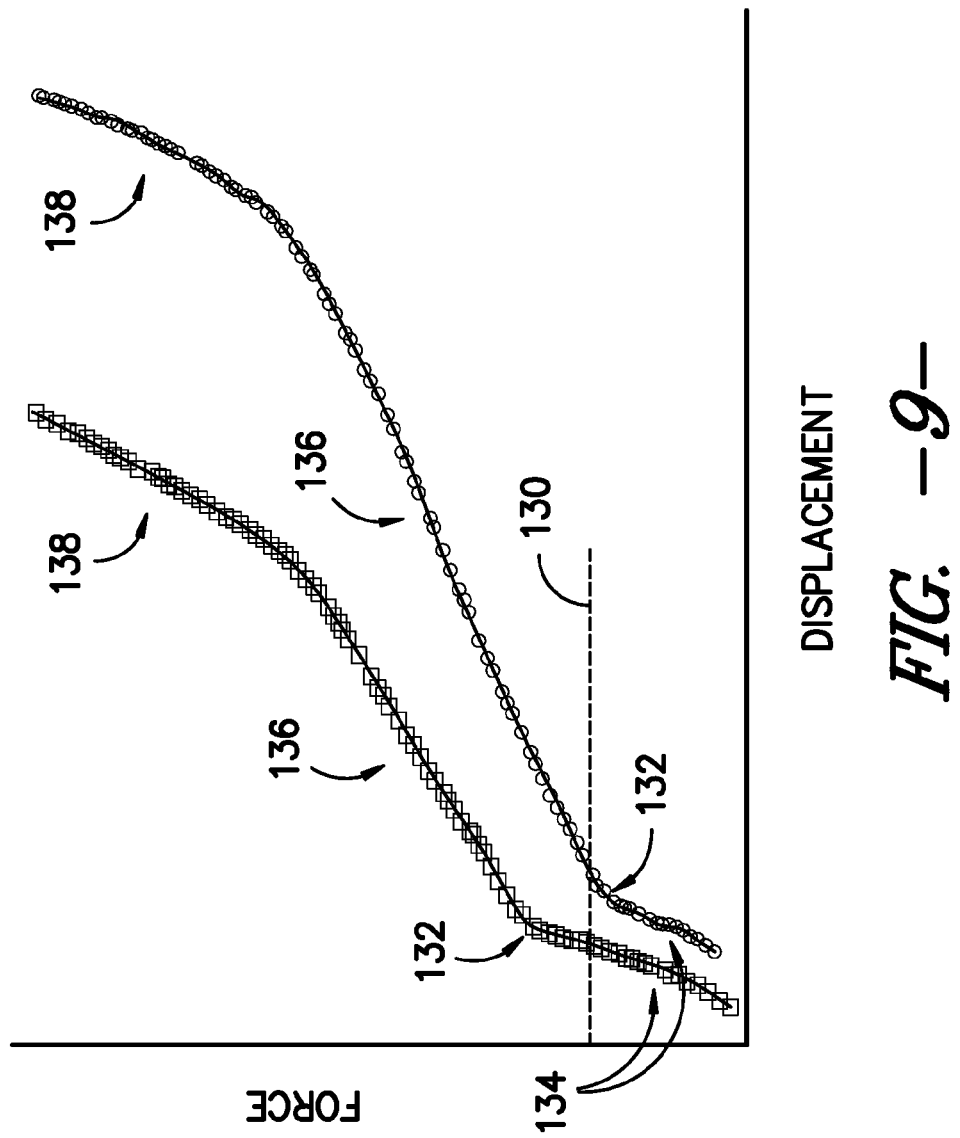
FIG. -9-

MEASUREMENT DEVICE AND METHOD FOR GENERATOR

FIELD OF THE INVENTION

The present disclosure relates in general to generators, and more specifically to measurement devices and methods for measuring stator wedge preload in generators.

BACKGROUND OF THE INVENTION

Turbine systems are widely utilized in fields such as power generation. For example, a conventional gas turbine system includes a compressor, a combustor, and a turbine connected to a generator. The mechanical energy produced by the compressor, combustor and turbine is transferred to the generator. The generator then converts the mechanical energy to electrical energy that may be deployed to a utility grid.

The stator of a typical generator includes a plurality of stator bars. The stator bars are placed in slots defined in a core of the stator, and are held in place in the slots by various components. For example, a resilient member, such as a ripple spring, is place between a stator bar and a stator wedge in the slot. The stator wedge and resilient member secure the stator bar in place. The stator wedge is retained in the slot at a required preload tightness by the resilient member, to ensure that the stator bar remains securely in place.

In many cases, particularly during in situ maintenance of generators, the amount of preload that the stator wedges are being subjected to requires monitoring. For example, during operation of the generator, the stator wedge can creep and/or the resilient member can wear. This lessens the amount of preload, and can cause stator bars to loosen.

Currently known methods for testing stator wedge preload include, for example, stator wedge tapping. A stator wedge is tapped with, for example, a hammer. The resulting sound is evaluated, either audibly or using suitable software and hardware, and correlated to preload. For example, the frequency and/or vibrations of the resulting sound may be evaluated. However, correlation of these sounds to preload is tenuous. Further, specific preload measurements are not available, and the tests are not generally repeatable because the operator may tap the stator wedge in a different place or with a different force.

Accordingly, improved measurement systems and methods for measuring preload in generators are desired in the art. For example, measurement systems and methods that can provide specific, accurate, and repeatable preload measurements would be advantageous. Further, such measurement systems and methods that can be utilized in in situ applications would be desired.

BRIEF DESCRIPTION OF THE INVENTION

Aspects and advantages of the invention will be set forth in part in the following description, or may be obvious from the description, or may be learned through practice of the invention.

In one embodiment, a measurement device for a generator is disclosed. The generator includes a stator and a rotor, the stator including a stator wedge. The measurement device includes a force application device, the force application device including an actuator operable to apply a force to the stator wedge. The measurement device further includes a sensor operable to measure displacement of the stator wedge. The measurement device further includes a controller in communication with the force application device and the sensor and configured to collect data associated with the force and the displacement.

In another embodiment, a method for measuring stator wedge preload is disclosed. The method includes applying a force to the stator wedge, increasing the force applied to the stator wedge, measuring a displacement associated with the force as the force increases, and transmitting data associated with the force and the displacement to a controller.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic illustration of a gas turbine system;

FIG. 2 is a perspective view of a portion of a generator with a measurement device positioned between a stator and a rotor of the generator according to one embodiment of the present disclosure;

FIG. 3 is a front view of a portion of a stator according to one embodiment of the present disclosure;

FIG. 4 is a cutaway perspective view of a portion of a stator according to one embodiment of the present disclosure;

FIG. 5 is a front perspective view of a measurement device in a collapsed position according to one embodiment of the present disclosure;

FIG. 6 is a front perspective view of a measurement device in an expanded position according to one embodiment of the present disclosure;

FIG. 7 is a rear perspective view of a measurement device in an expanded position according to one embodiment of the present disclosure;

FIG. 8 is a cross-sectional view of a measurement device in an expanded position according to one embodiment of the present disclosure; and FIG. 9 is a controller output according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a turbine system 10, which in this embodiment is a gas turbine system. The system 10 may include a compressor 12, a combustor 14, and a turbine 16. Further, the system 10 may include a plurality of compressors 12, combustors 14, and turbines 16. The compressors 12 and turbines 16 may be coupled by a shaft 18. The shaft 18 may be a single shaft or a plurality of shaft segments coupled together to form shaft 18. Various other systems, such as steam turbine systems, may be connected to the gas turbine system 10. Further, it should be understood that the present disclosure is not limited to gas turbine systems 10, and rather that any suitable gas, steam, or other turbine system is within the scope and spirit of the present disclosure.

The system 10 may further include a generator 20. The generator 20 may accept mechanical energy developed by the other components of the system 10 and convert this energy into electrical energy. For example, as shown in FIGS. 2 through 4, the generator 20 may include a rotor 22 and a stator 24. As is known in the art, the rotor 22 is a generally movable component of the generator 20, while the stator 24 is a generally stationary component of the generator 20. The stator 24 may generally surround the rotor 22, such that a gap 26 is defined therebetween.

As further shown in FIGS. 2 through 4, a stator 24 according to the present disclosure includes a core 30. A plurality of slots 32 are defined in the core 30, typically in a generally annular array as shown. One or more stator bars 34 are positioned within each slot 32. Various components are further positioned within each slot 32 to secure a stator bar 34 within a slot 32. For example, a wedge 36 may be positioned in a slot 32. Further, the wedge 36 may be retained in the slot 32. For example, as shown, a slot 32 may include one or more female mating components 40, such as dovetail grooves as shown. The wedge 36 may include male mating components 42, such as the sides of the wedge as shown or other suitable protrusions that mate with the female mating components 40. Alternatively, a slot 32 may include male components for mating with female components included on a wedge 36, or a slot 32 and wedge 36 may include any other suitable components for retaining the wedge 36 in the slot 32.

Further, various components may be positioned between a wedge 36 and stator bar 34. As shown in FIGS. 3 and 4, for example, a resilient member 46 may be positioned within a slot 32 between a stator bar 34 and a wedge 36. The resilient member 46 may be a spring, such as a ripple spring as shown, or may be any other suitable resilient component. The resilient member 46 may be compressed between the stator bar 34 and wedge 36 when properly positioned within the slot 32, such that a preload, also known as a load, pressure, or tightness, is applied to the wedge 36. In other words, the compressed resilient member 46 may apply an outward force to the wedge 36. This preload may secure the stator bar 34 in the slot 32. In other embodiments, the preload may be applied to the stator wedge 36 by another suitable component being inserted between a wedge 36 and stator bar 34, or by the wedge 36 itself being coupled to the slot 32.

Still further, in some embodiments, a filler layer 50 may be included in a slot 32. The filler layer 50 may generally be an insulating layer, formed of for example fiberglass or another suitable material. The filler layer 50 may typically be positioned between the stator bar 34 and the resilient member 46.

In some embodiments, a slide 52 may be included in a slot 32. The slot 32 may be positioned between a wedge 36 and resilient member 46, and may be inserted between the wedge 36 and resilient member 46 to apply the preload. For example, as shown in FIG. 4, in some embodiments wherein a slide 52 is included, the wedge 36 and slide 52 may have opposing tapers. Insertion of the slide 52 between the wedge 36 and resilient member 46 may gradually force the resilient member 46 and wedge 36 away from one another, thus compressing the resilient member 46 and applying the preload.

It should be understood that the above described components of stator 24 are merely various components of one embodiment of a stator 24, and that any suitable stator 24 and arrangement of components therein is within the scope and spirit of the present disclosure.

As discussed above, it is frequently desirable and/or required to measure stator wedge 36 preload, to ensure that the preload is sufficient to secure the stator bar in place. This is especially of concern during in situ maintenance of a generator 20, because various components, such as stator wedges 36 and/or resilient members 46, may wear and/or creep.

Thus, the present disclosure is further directed to a measurement device 100. Measurement devices 100 according to the present disclosure advantageously provide specific, accurate and repeatable preload measurements. Further, as discussed below, measurement devices 100 according to the present disclosure can be inserted between the stator 24 and rotor 22 of a generator 20, so that preload measurement can be efficiently and accurately performed during in situ applications.

As shown in FIGS. 2 and 5 through 8, for example, a measurement device 100 according to the present disclosure includes one or more force application devices 102, sensors 104, and controllers 106. A force application device 102 applies a force to the stator wedge 36. As discussed below, this force may be correlated with a displacement of the stator wedge 36 caused by application of the force to measure preload. A force application device 102 may include, for example, an actuator 110. The actuator 110 may be operable to apply the force to the stator wedge 36. For example, in exemplary embodiments as shown, the actuator 110 is a hydraulic cylinder. The hydraulic cylinder may generally include a cylinder 112 and a rod 114 extending from the cylinder. The rod 114 may be actuated to move in a generally linear direction due to the introduction of hydraulic fluid to the cylinder 112 through a hydraulic line 116 and a hydraulic union 118, which couples the line 116 to the cylinder 118. Such movement of the rod may thus apply a force to the stator wedge 36. In other embodiments, the actuator 110 may be, for example, a pneumatic cylinder, a gear assembly, or any other suitable actuatable device.

The force application device 102 may further include a load cell 120. The load cell 120 may be operable to measure the force applied to the stator wedge 36 by the force application device 102, such as by the actuator 110 thereof. Thus, the load cell 120 may be in communication with the actuator 110 such that data associated with the force is transmitted from the actuator 110 to the load cell 120. For example, in some embodiments, the load cell 120 may be in contact with actuator 110, such that the force applied to the stator wedge 36 is directly transmitted to the load cell 120. In other embodiments, the load cell 120 may be in wired or wireless communication with the actuator 110, or otherwise in communication with the actuator 110. A load cell 120 according to the present disclosure may be, for example, a strain gauge, hydraulic load cell, hydrostatic load cell, piezoelectric load cell, vibrating wire load cell, or any other device suitable for measuring force applied by the force application device 102.

Additionally, the load cell 120 may be in communication with a controller, as discussed below. Thus, the load cell 120 may transmit data associated with the force to the controller.

In some embodiments, the force application device 102 may further include a load plate 122. The load plate 122 may be connected to the actuator 110. For example, the load plate 122 may be connected to a movable portion, such as a rod 122 as shown, of the actuator 110. The load plate 112 may be connected to the actuator 110 by a mechanical fastener 124, such as a screw, nut-bolt combination, nail, rivet, or other suitable mechanical fastening device, or may be otherwise connected to the actuator 110, such as through welding, manufacturing as a unitary component, or otherwise connected. Operation of the actuator 110 may move the load plate 122. The force applied by the actuator 110 may be applied through the load plate 122 to the stator wedge 36. The load plate 122 may include a load surface 126. This surface 126 may contact the stator wedge 36, so that the force is applied through the load surface 126.

A measurement device 100 according to the present disclosure may further include one or more sensors 104. A sensor 104 according to the present disclosure may be operable to measure displacement of the stator wedge 36. For example, the sensor 104 may measure relative proximity to various other stator 24 components, such as the core 30, during applications of force by the force application device 102. Changes in proximity, and thus displacement of the stator wedge 36, due to changes in force may thus be measured by the sensor 104. A sensor 104 according to the present disclosure may be any suitable displacement or proximity sensing device, such as a capacitive sensor, capacitive displacement sensor, eddy current sensor, inductive sensor, magnetic sensor, optical sensor, photocell sensor, radar sensor, or sonar sensor.

Additionally, a sensor 104 may be in communication with a controller, as discussed below. Thus, the sensor may transmit data associated with the displacement to the controller.

In some embodiments, a sensor 104 may be connected to the load plate 122. For example, as shown, the load plate 122 may further include one or more brackets 128. A sensor 104 may be connected to a bracket 128, and positioned in the bracket 128 to measure displacement of the stator wedge 36 as discussed above.

A measurement device 100 according to the present disclosure may further include a controller 106. The controller 106 may be in communication with the force application device 102, such as with the actuator 110 or load cell 120 thereof, and with the sensors 104. Such communication may be through, for example, any suitable wired or wireless connection. The controller 106 may be configured to collect data associated with the force and displacement applied and measured by the respective force application device 102 and sensors 104. The data may be transmitted by the force application device 102 and sensors 104 as discussed above.

A controller 106 according to the present disclosure may include one or more processors and associated memory devices configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory devices may generally comprise memory elements including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory devices may generally be configured to store suitable computer-readable instructions that, when implemented by the processors, configure the controller 106 to perform various functions including, but not limited to, the various functions described herein.

For example, as discussed above, the controller 106 may be configured to collect data associated with force and displacement, as discussed above. Further, in some embodiments, the controller 106 may be configured to output a relationship between force and displacement. FIG. 9 illustrates one embodiment of a relationship outputted by a controller 106 according to the present disclosure. In this embodiment, the output is a graphical representation of the relationship between force and displacement. The output shown in FIG. 9 illustrates two different outputs from measurements taken from two different stator wedges 36. Such an output can be utilized to determine whether a stator wedge 36 and/or other component, such as a resilient member 46, requires replacement. For example, a minimum force or displacement value, shown as a threshold value 130 in FIG. 9, can be set. If a certain portion of the curve illustrating the force-displacement relationship is, for example, below the threshold value 130, this may indicate that the stator wedge 36 and/or other component requires replacement. For example, a maximum value 132 of a first region 134 (as opposed to a second region 136 or third region 138), which may in some embodiments be an inflection point, may be compared to the threshold value 130. The first region 134 may represent the force required to initially move the stator wedge 36 into a stationary position wherein, for example, the resilient member 46 is generally fully compressed. If this value 132 is below the threshold value 130, the stator wedge 36 and/or other component may require replacement.

It should be noted that the force applied and displacement measured according to the present disclosure may change during operation of the measurement device 100. For example, an initial force may be applied to the stator wedge 36. This force may then be increased. The resulting initial displacement and change in displacement may be measured. This force and displacement data may be transmitted as discussed above, and the resulting output may illustrate the force-displacement relationship.

A measurement device 100 according to the present disclosure may, in exemplary embodiments, further be modifiable so that the device 100 can fit between a stator 24 and rotor 22. The device 100 may for example be fitted past a retaining ring (not shown) of a rotor 22 and into the gap 26 between the stator 24 and rotor 22. This may advantageously allow the measurement device 100 to be utilized in in situ applications.

As shown in FIGS. 5 through 7, for example, the measurement device 100, such as the load application device 102 thereof, may be rotatable between a first collapsed position and a second expanded position. The measurement device 100 in the first collapsed position is shown in FIG. 5, while the measurement device 100 in the second expanded position is shown in FIGS. 6 and 7. For example, the measurement device 100 may further include a frame 140. The load application device 102 may be rotationally coupled to the frame 140. As shown, when in the collapsed position, the actuator 110 may extend generally along a longitudinal axis of the frame 140. When in the expanded position, the actuator 110 may extend generally perpendicular to the longitudinal axis of the frame 140. Rotation of the load application device 102 into the collapsed position may thus facilitate insertion of the device 100 into the gap 26. Rotation of the load application device 102 into the expanded position after insertion may then allow the load application device 102 and measurement device 100 in general to operate as discussed above.

A pivot point 142 may be defined at the rotational coupling of the load application device 102 to the frame 140. This pivot point 142 may, for example, be aligned with a central axis of the hydraulic union 118. The load application device 102 may pivot about the pivot point 142. Further, an actuator 144 may be connected to the load application device 102, and may be operable to cause the load application device 102 to pivot. The actuator 144 in exemplary embodiments may be a pneumatic cylinder, or alternatively a hydraulic cylinder or gear assembly. For example, in embodiments wherein the actuator is a pneumatic cylinder, a rod 146 may be connected to the load application device 102. Operation of the actuator 144 may extend and retract the rod 146, and such extension and retraction may rotate the load application device 102 between the first collapsed position and the second expanded position. In some embodiments, the actuator 144 may be fully or partially enclosed within the frame 140. In other embodiments, the actuator 144 may be outside of the frame 140.

In some embodiments, a measurement device 100 according to the present disclosure may further include a base surface 150. The base surface 150 may be mountable to the rotor 22. For example, when a measurement device 100 is inserted between a stator 24 and rotor 22, the measurement device 100 may be placed on the rotor 22 to facilitate measurement of a stator wedge 36. The measurement device 100 may be placed on the rotor 22 such that the base surface 150 contacts, and thus is mounted to, the rotor 22.

In some embodiments, at least a portion of the base surface 150 may be a surface of the frame 140 or the load application device 102. In other embodiments, as shown in FIGS. 6 and 7, the measurement device 100 may include a base plate 152. At least a portion of the base surface 150 may be included on the base plate 152. Further, the base plate 152 may be movable between a first retracted position and a second expanded position. The measurement device 100 in the first retracted position is shown in FIG. 7, while the measurement device 100 in the second expanded position is shown in FIG. 6. Movement of the base plate 152 into the expanded position may facilitate mounting to the rotor 22. For example, the base plate 152 in the expanded position may provide a stable base surface 150 for mounting to the rotor 22. Movement of the base plate 152 into the retracted position may further facilitate rotation of the load application device 102 into the first collapsed position, thus allowing insertion of the measurement device 100 between a stator 24 and rotor 22, as discussed above.

An actuator 154 may be connected to the base plate 152, and may be operable to cause the base plate 152 to move. The actuator 154 in exemplary embodiments may be a pneumatic cylinder, or alternatively a hydraulic cylinder or gear assembly. For example, in embodiments wherein the actuator is a pneumatic cylinder, a rod 156 may be connected to the base plate 152. Operation of the actuator 154 may extend and retract the rod 156, and such extension and retraction may move the base plate 152 between the first retracted position and the second expanded position. In some embodiments, the actuator 154 may be fully or partially enclosed within the frame 140. In other embodiments, the actuator 154 may be outside of the frame 140. The base plate 152 when in the retracted position may, in some embodiments, be at least partially housed within the frame 140.

The present disclosure is further directed to a method for measuring stator wedge 36 preload. The method may include, for example, applying a force to the stator wedge 36, increasing the force applied to the stator wedge 36, and measuring a displacement associated with the force as the force increases. The method may further include transmitting data associated with the force and displacement to a controller, and outputting a relationship between the force and the displacement.

Such various steps may in exemplary embodiments be performed by a measurement device 100. Such measurement device 100 may be configured to perform one or more of these steps, as discussed above. Further, in some embodiments, the method may include, for example, inserting the measurement device 100 between a rotor 22 and a stator 24. Further, the method may include, for example, rotating the measurement device 100, such as a load application device 102 thereof, between a first collapsed position and a second expanded position. Still further, the method may include, for example, moving a base plate 152 of the measurement device 100 between a first retracted position and a second expanded position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A measurement device for a generator, the generator comprising a stator and a rotor, the stator comprising a stator wedge, the measurement device comprising:
   a force application device, the force application device comprising an actuator operable to apply a force to the stator wedge;
   a sensor operable to measure displacement of the stator wedge; and
   a controller in communication with the force application device and the sensor and configured to collect data associated with the force and the displacement.

2. The measurement device of claim 1, further comprising a base surface mountable to the rotor.

3. The measurement device of claim 2, further comprising a base plate comprising the base surface, the base plate movable between a first retracted position and a second expanded position.

4. The measurement device of claim 1, wherein the actuator is a hydraulic cylinder.

5. The measurement device of claim 1, wherein the force application device further comprises a load plate, the load plate comprising a load surface, and wherein the load plate is connected to the actuator such that the force is applied by the actuator through the load surface to the stator wedge.

6. The measurement device of claim 5, wherein the sensor is connected to the load plate.

7. The measurement device of claim 1, wherein the force application device further comprises a load cell, the load cell operable to measure the force and in communication with the controller.

8. The measurement device of claim 1, wherein the force application device is rotatable about a pivot point between a first collapsed position and a second expanded position.

9. The measurement device of claim 1, wherein the controller is further configured to output a relationship between the force and the displacement.

10. A generator measurement system, comprising:
    a rotor;
    a stator generally surrounding the rotor, the stator comprising a stator wedge;
    a measurement device insertable between the rotor and the stator, the measurement device comprising:

a force application device, the force application device comprising an actuator operable to apply a force to the stator wedge;

a sensor operable to measure displacement of the stator wedge; and a controller in communication with the force application device and the sensor and configured to collect data associated with the force and the displacement.

11. The system of claim 10, further comprising a base plate comprising a base surface, the base plate movable between a first retracted position and a second expanded position.

12. The system of claim 10, wherein the force application device further comprises a load plate, the load plate comprising a load surface, and wherein the load plate is connected to the actuator such that the force is applied by the actuator through the load surface to the stator wedge.

13. The system of claim 10, wherein the force application device is rotatable about a pivot point between a first collapsed position and a second expanded position.

14. The system of claim 10, wherein the controller is further configured to output a relationship between the force and the displacement.

15. A method for measuring stator wedge preload, the method comprising:

applying a force to the stator wedge;

increasing the force applied to the stator wedge;

measuring a displacement associated with the force as the force increases; and transmitting data associated with the force and the displacement to a controller.

16. The method of claim 15, further comprising outputting a relationship between the force and the displacement.

17. The method of claim 15, further comprising inserting a measurement device between a rotor and a stator, the stator comprising the stator wedge.

18. The method of claim 17, wherein the measurement device is configured to apply the force, increase the force, measure the displacement, and transmit the data.

19. The method of claim 17, further comprising rotating the measurement device about a pivot point between a first collapsed position and a second expanded position.

20. The method of claim 17, further comprising moving a base plate of the measurement device between a first retracted position and a second expanded position.

* * * * *

UNITED STATES PATENT AND TRADEMARK OFFICE
CERTIFICATE OF CORRECTION

PATENT NO.         : 8,839,684 B2                                      Page 1 of 1
APPLICATION NO.    : 13/553003
DATED              : September 23, 2014
INVENTOR(S)        : Banowetz et al.

It is certified that error appears in the above-identified patent and that said Letters Patent is hereby corrected as shown below:

In the specification,

In Column 4, Line 37, delete "cylinder 118." and insert -- cylinder 112. --, therefor.

In Column 4, Line 66, delete "load plate 112" and insert -- load plate 122 --, therefor.

Signed and Sealed this
Twenty-seventh Day of October, 2015

Michelle K. Lee
*Director of the United States Patent and Trademark Office*